(12) United States Patent
Frigo et al.

(10) Patent No.: US 6,381,047 B1
(45) Date of Patent: Apr. 30, 2002

(54) PASSIVE OPTICAL NETWORK USING A FABRY-PEROT LASER AS A MULTIWAVELENGTH SOURCE

(75) Inventors: Nicholas J. Frigo; Patrick P. Iannone, both of Red Bank; Kenneth C. Reichmann, Hamilton Square; Sheryl L. Woodward, Holmdel, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/119,411

(22) Filed: Jul. 20, 1998

Related U.S. Application Data
(60) Provisional application No. 60/084,400, filed on May 6, 1998.

(51) Int. Cl.[7] .............................................. H04J 14/02
(52) U.S. Cl. ........................ 359/124; 359/125; 359/126
(58) Field of Search ......................... 359/125, 127, 359/133, 130, 126, 132, 124; 372/23

(56) References Cited

U.S. PATENT DOCUMENTS

| | | | |
|---|---|---|---|
| 4,221,472 A | | 9/1980 | Smith et al. ................. 359/130 |
| 4,989,201 A | | 1/1991 | Glance ........................ 359/133 |
| 5,027,435 A | | 6/1991 | Chraplyvy et al. .......... 359/173 |
| 5,278,687 A | * | 1/1994 | Jannson et al. ............. 359/125 |
| 5,495,360 A | | 2/1996 | Yoo ............................ 359/248 |
| 5,574,584 A | | 11/1996 | Darcie et al. ............... 359/125 |
| 5,589,969 A | * | 12/1996 | Taga et al. .................. 359/124 |
| 5,631,758 A | * | 5/1997 | Knox et al. ................. 359/127 |
| 5,680,234 A | | 10/1997 | Darcie et al. ............... 359/110 |
| 5,689,356 A | * | 11/1997 | Rainal ........................ 359/181 |
| 5,701,371 A | | 12/1997 | Ishida ......................... 385/17 |
| 5,726,785 A | | 3/1998 | Chawki et al. .............. 359/130 |
| 5,943,352 A | * | 8/1999 | Fee ............................. 372/32 |
| 6,034,799 A | * | 3/2000 | Hansen ....................... 359/124 |
| 6,081,355 A | * | 6/2000 | Sharma et al. .............. 359/110 |
| 6,118,561 A | * | 9/2000 | Maki .......................... 359/124 |

OTHER PUBLICATIONS

Frigo, Nicholas J., "A Survey of Fiber Optics in Local Access Architectures," *Optical Fiber Telecommunications*, vol. IIIa, pp. 461–521, 1997.

Wagner, S.S. and Chapuran, T.E., "Broadband High–Density WDM Transmission Using Superluminescent Diodes," *Electronic Letters*, vol. 26, No. 11, pp. 696–697, 1990.

Zirngibl, M., et al. "LARNet, a Local Access Router Network," *IEEE Photonics Technology Letters*, vol. 7, No. 2, pp. 215–217, 1995.

Iannone, P.P., et al. "WDM passive–optical–network architecture with bidirectional optical spectral slicing," *Optical Fiber Conference '95 Technical Digest*, pp. 51–53, 1995.

Woodward, S.L., et al. "Reduction of Optical–Beat Interference in Subcarrier Networks," *IEEE Photoics Technology Letters*, vol. 8, No. 5, pp. 694–696, 1996.

Petermann, K., "Laser Diode Modulation and Noise", *Advances in Optoelectronics*, pp. 108–111 and 186–194, 1988.

Wang, L.A. et al., "Medium–Density WDM System with Fabry–Perot Laser Diodes for Subscriber Loop Applications", *IEEE Photoics Technology Letters*, vol. 3, No. 6, pp. 554–556, 1991.

\* cited by examiner

*Primary Examiner*—Leslie Pascal
*Assistant Examiner*—Dalzid Singh
(74) *Attorney, Agent, or Firm*—Morgan & Finnegan, L.L.P.

(57) ABSTRACT

A passive optical network (PON) comprises an optical device for producing light at a plurality of optical frequencies, an optical receiver for receiving light produced by the optical device, and a wavelength division multiplexer for transmitting the light produced by the optical device to the optical receiver, the wavelength division multiplexer having passbands centered at respective center frequencies, the center frequencies being different than the optical frequencies.

17 Claims, 10 Drawing Sheets

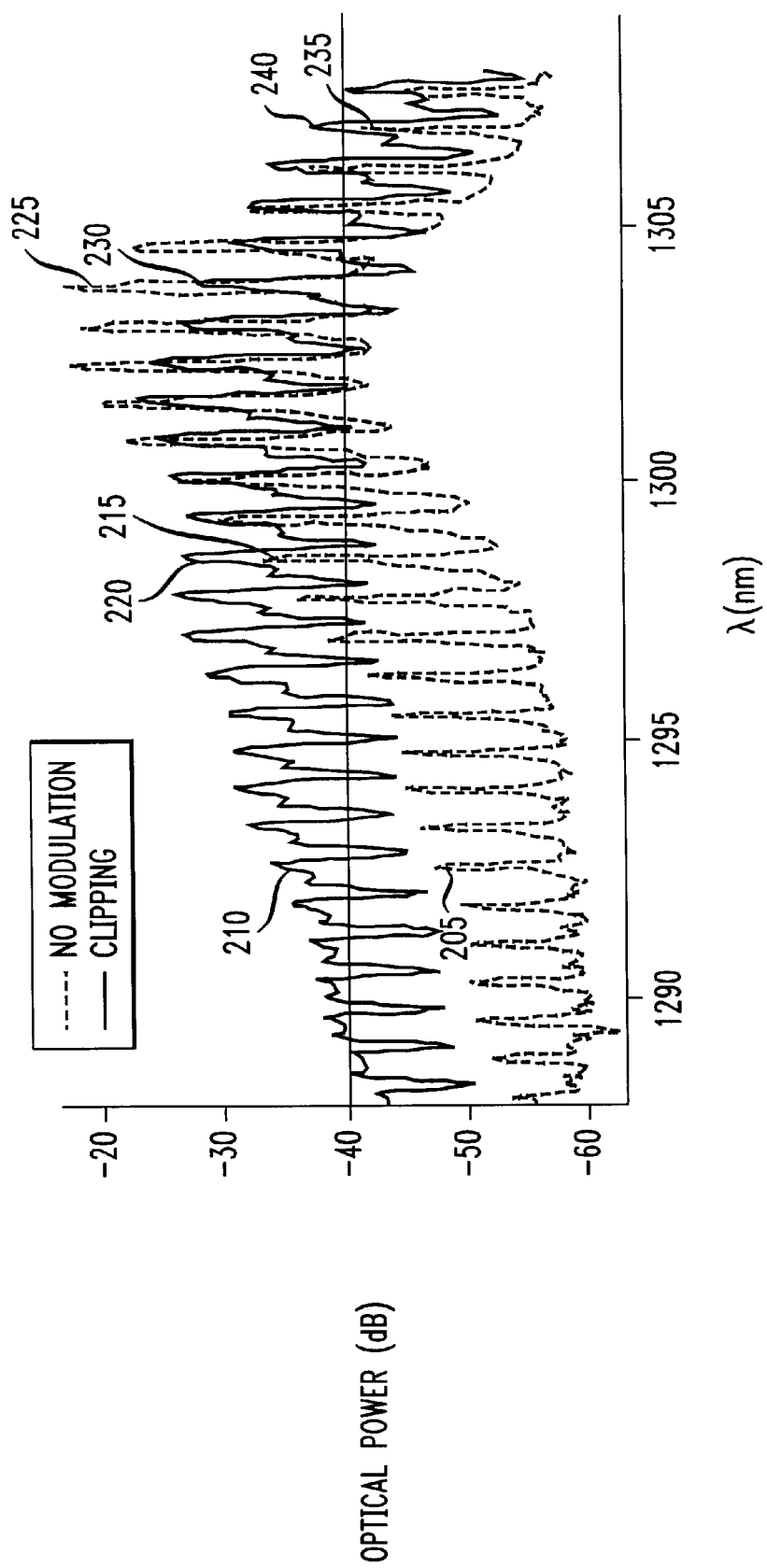

700

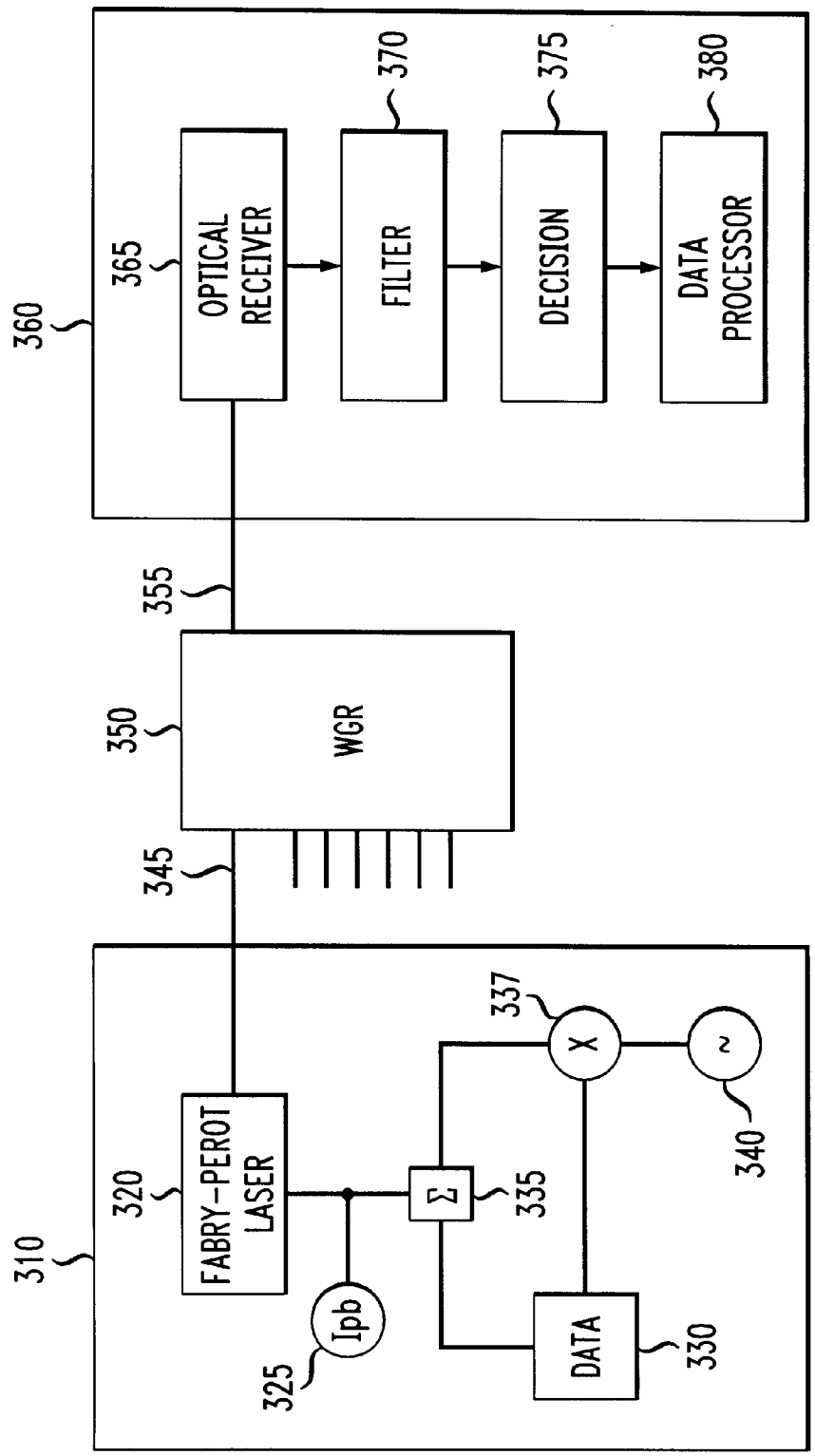

PASSIVE OPTICAL NETWORK USING A FABRY-PEROT LASER AS A MULTIWAVELENGTH SOURCE

RELATED APPLICATIONS

This application claims the benefit of U.S. Provisional Application No. 60/084,400 filed May 6, 1998.

BACKGROUND OF THE INVENTION

The present invention relates to a passive optical network, and, more particularly, is directed to use of multimode or multifrequency lasers as light sources in a wavelength division multiplexed passive optical network.

As defined in Frigo, "A Survey of Fiber Optics in Local Access Architectures", in Kaminow et al., ed., *Optical Fiber Telecommunications IIIA*, Academic Press, 1997, pp 461–522, the disclosure of which is hereby incorporated by reference, the term passive optical network (PON) refers to a configuration, as shown in FIG. 1, having a central office with a host digital terminal (HDT) coupled via optical fibers to remote nodes which are, in turn, coupled via optical fibers to subscriber terminals. The central office and terminals exchange information via light signals carried by the optical fibers. The "passive" aspect of the PON is due to the processing, at the remote nodes, of signals between the central office and terminals in an entirely optical manner, that is, without conversion to electronic signals. The optical fibers may or may not amplify the signals which they carry.

One type of PON is the wavelength division multiplexed (WDM) passive optical network (PON). In a WDM PON, a significant component at the remote node is a wavelength division multiplexer, which serves to combine, or multiplex, a plurality of optical signals each having a distinct wavelength and having respective data rates into an optical transmission having a data rate which is at least the sum of the respective data rates, and also serves to separate, or demultiplex, a single optical transmission into a plurality of optical signals each having a distinct wavelength and having respective data rates lower than the data rate of the single optical transmission. Different optical wavelengths are used between the central office and the respective terminals, so that the WDM PON functions as a logical star configuration.

A waveguide grating router (WGR) is a type of WDM. In a WGR, shown in FIG. 2, incoming light is split into spectral constituents and output to a set of fibers. A WGR has a routing property and a periodicity property.

As explained in Frigo, the routing property of a WGR means that for a set of input ports, $i_1, i_2 \ldots i_n$, and a set of output ports, $o_1, o_2 \ldots o_n$, an incoming signal at one of the input ports having frequency $f_k$, $1 \leq k \leq n$, selects its own routing due to its frequency. Let the input port be $i_j$ and the output port be $o_p$, $1 \leq j \leq n$, $1 \leq p \leq n$. For an incoming signal $f_k$ at input port $i_j$, the output signal will be at output port $o_p$, with $p=(j+(k-1))$ modulo n.

The periodicity property of a WGR means that an input signal k at a frequency exceeding n exits at an output port given by k modulo n. That is, the periodicity property is expressed as a modulo function, corresponding to a sort of "wrap around", rather than having the input signal be lost. As explained in Frigo, the periodicity property effectively samples a broadband incoming signal at many points for each port.

As described in U.S. Pat. No. 5,680,234 (Darcie et al.), having a common assignee with the present invention, the disclosure of which is hereby incorporated by reference, signals can be broadcast from a central office to remote nodes using a WDM PON. Henceforth, a PON containing a WDM at the remote mode is referred to herein as a WDM PON, regardless of whether the multiplexing or demultiplexing capability of WDM is used.

In the upstream direction, from the subscriber terminal to the central office, use of a light emitting diode (LED) as the light source at the subscriber terminal has been proposed to avoid the need for a frequency-specified laser or a modulator at the terminal's optical network unit, thereby reducing deployment costs. In this proposal, the output of a LED is directly modulated with the upstream information and is spectrally sliced into different optical bands at the WGR.

In the downstream direction, from the central office to a terminal, a lightsource proposed for use at the central office transmitter is a multi-frequency laser, including laser arrays or tunable lasers, which is wavelength controlled so that the frequencies emitted by the laser line up with, or match, the frequencies of the WGR and channels. A difficulty in using uncooled multi-frequency lasers as optical sources is that the frequency of the light drifts, and so the signal frequencies become misaligned with the WGR passband frequencies. Furthermore, the WGR may have an environmental sensitivity: as the temperature changes, the spectral location of its passbands is likely to move, which is a source of misalignments. The drift problem can be corrected by controlling the laser's temperature, but this raises the cost of the laser. A problem with temperature controlled transmitters is that they are too expensive to be used at each terminal, but they are economically feasible at the central office.

Alternatively, Iannone, Frigo and Darcie, "WDM passive optical network architecture with bidirectional optical spectral slicing," *Optical Fiber Conference '95 Technical Digest*, pages 51–53, have proposed using a broadband source, such as a 1.3 $\mu$m LED, to broadcast downstream information. Use of an LED as an optical source has disadvantages, such as the LED cannot be modulated as fast as a laser can be modulated, and the LED generates signals with less optical power than the signals generated by a laser.

Thus, there are opportunities to improve light sources in WDM PONs.

SUMMARY OF THE INVENTION

In accordance with an aspect of this invention, there is provided a passive optical network (PON) comprising an optical device for producing light at a plurality of optical frequencies, an optical receiver for receiving light produced by the optical device, and a wavelength division multiplexer for transmitting the light produced by the optical device to the optical receiver, the wavelength division multiplexer having passbands centered at respective center frequencies, the center frequencies being different than the optical frequencies.

In aspects of the invention, the optical device is a multifrequency laser, an array of lasers, or a multimode laser, such as a Fabry-Perot laser, driven in such a manner as to increase the number of usable modes. The temperature of the optical device is either uncontrolled or locally controlled to reduce costs, that is, the laser's temperature is not specifically set to align the laser's modes with the passbands of the wavelength division multiplexer.

In other aspects of the invention, the wavelength division multiplexer transmits light produced by the optical device in each of its passbands, and the spacing between the optical frequencies is less than the spacing between the center frequencies. The wavelength division multiplexer may be a waveguide grating router having a free spectral range less than the frequency range of the optical frequencies.

In a further aspect of the invention, the optical device is associated with a first subscriber, there is at least one additional optical device associated with at least one additional subscriber, and there is means for equalizing the light from different optical devices, such as a prebias current supplied to one of the multimode lasers.

It is not intended that the invention be summarized here in its entirety. Rather, further features, aspects and advantages of the invention are set forth in or are apparent from the following description and drawings.

BRIEF DESCRIPTION OF THE DRAWINGS

FIG. 6 is a chart showing the power versus wavelengths emitted by a Fabry-Perot laser according to the present invention, with and without clipping;

FIG. 10 is a block diagram of another embodiment of the present invention;

DETAILED DESCRIPTION OF THE PREFERRED EMBODIMENTS

Figure 1:
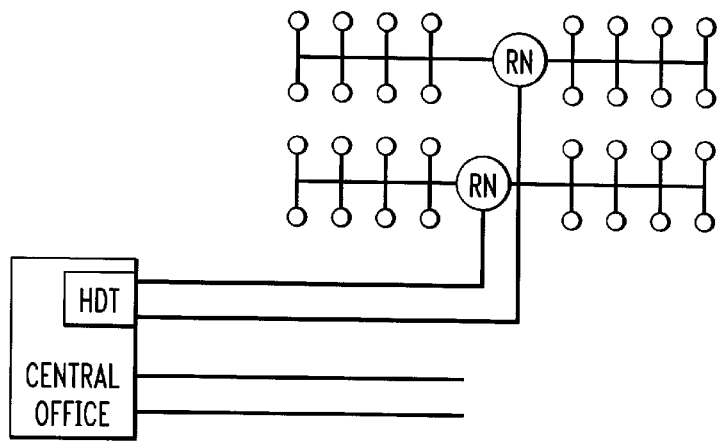
FIG. 1 is a block diagram illustrating a passive optical network.
Figure 2:
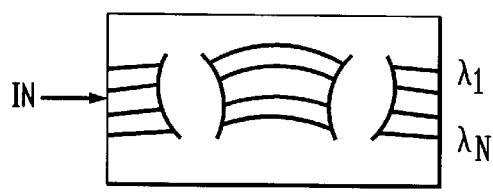
FIG. 2 is a symbol depicting a waveguide grating router (WGR)
Figure 3:
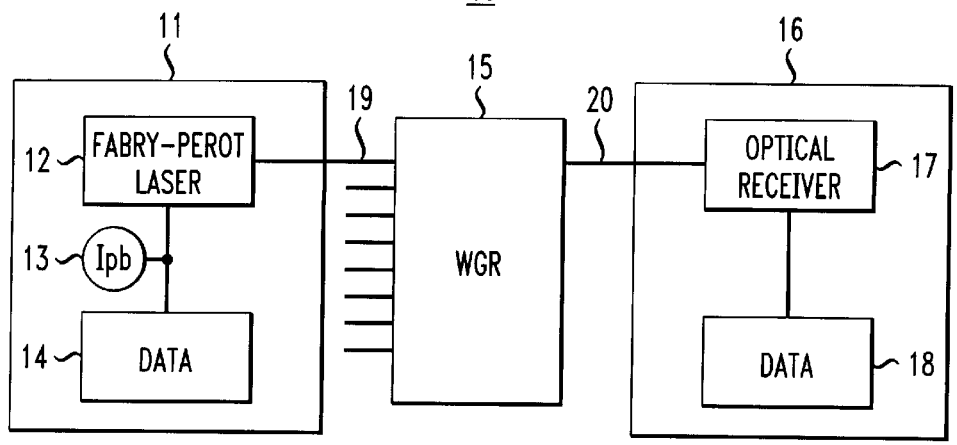
FIG. 3 is a block diagram of an embodiment of the present invention.

Referring now to FIG. 3, there is shown WDM PON 10 according to the present invention. WDM PON 10 comprises subscriber terminal 11 coupled by optical fiber 19 to remote node 15, which is, in turn, coupled by optical fiber 20 to central office 16. Subscriber terminal 11 includes laser 12, current source 13 and data source 14. Remote node 15 is shown as waveguide grating router (WGR) 15. Central office 16 includes optoelectronic receiver 17 and data receiver 18.

Laser 12 is a multi-frequency laser or laser array. Multi-frequency lasers simultaneously emit light at multiple frequencies, but each frequency corresponds to a different laser cavity mode. That is, a multi-frequency laser is made of multiple resonators. One type of multi-frequency laser is described in Zirngibl, M. et al., "LARNet, a Local Access Router Network", *IEEE Photonics Technology Letters,* vol. 7, no. 2, pages 215–217, 1995. Another type of multi-frequency laser is a tunable laser, which is a single laser cavity capable of having its output wavelength varied over a wide range in a controlled manner. Additionally, laser arrays are sometimes referred to as a multi-frequency laser. A laser array is a set of independent lasers having respective outputs which are optically combined into a single common output port. Typically, a laser array is integrated onto a laser monolithic chip.

The light output from laser 12 is supplied through fiber 19 to WGR 15. For light to be transmitted through WGR 15, the mode spacing of laser 12 and WGR 15 must be compatible. Laser 12 may be uncooled. If laser 12 is cooled, its cooling is not controlled to align the mode spacing of laser 12 and WGR 15. That is, the wavelengths of laser 12 are not aligned with the channels of WGR 15. In accordance with the present invention, the mode spacing of laser 12 is chosen to be less than the channel spacing of WGR 15, to ensure that at least one mode, or fractions of two modes, will be aligned with each channel of WGR 15.

Figure 4A:
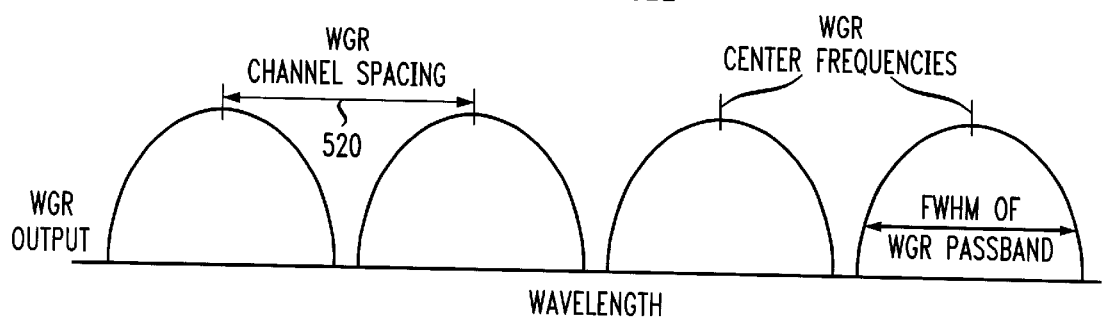
FIGS. 4A and 4B are charts showing the mode spacing of a WGR and laser according to the present invention.
Figure 4B:
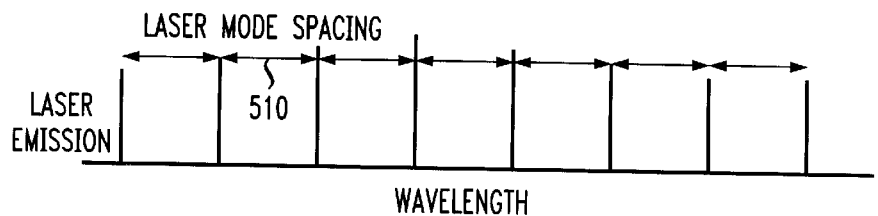

FIG. 4A shows a representative channel spacing for WGR 15, and FIG. 4B shows a representative mode spacing for laser 12. Laser mode spacing 510 is seen to be less than WGR channel spacing 520. The mode spacing of the laser must be different than the channel spacing of the WGR to eliminate any need for the wavelength of the laser's modes to track the channels of the WGR. FIGS. 4A and 4B illustrate a configuration in which the WGR has passbands centered at respective center frequencies different than the optical frequencies of light produced by the laser.

When the mode spacing of the laser is less than the channel spacing of the WGR, then the mode spacing of the laser may be chosen to be equal to the full-width-half-maximum (FWHM) of the transmission passband of a WGR channel. FIG. 4A shows the FWHM of a channel of a WGR. The exact choice of mode spacing will depend on the loss tolerance of WDM PON 10, including the characteristics of the WGR. To ensure that light will be emitted from each output port of the WGR, the optical frequencies output by the laser must cover a broad enough range of frequencies. When the WDM is a WGR, then the laser's output frequencies must span the free-spectral range (FSR) of the WGR. The WGR's FSR is the frequency separation between modes emerging from a given WGR port.

When the WDM is a WGR, then because of the periodicity of the WGR transmission characteristic, the laser's mode spacing may be greater than the channel spacing of the WGR. In this case the output of the laser must cover a much greater frequency range.

For example, if (i) the laser mode spacing is J times the WGR channel spacing, (ii) the FSR of WGR 15 is K times its channel spacing, (iii) J and K are relatively prime integers, and (iv) the usable wavelengths of laser 12 span J×(K−1)×the channel spacing of WGR 15, ensuring that laser 12 emits over a sufficiently broad range of wavelengths, then laser light is emitted from each output port of WGR 15 due to its periodicity property, discussed above.

It will be understood that there are a plurality of subscriber terminals, of which subscriber terminal 11 is representative, and also a plurality of remote nodes, of which remote node 15 is representative.

Communication between subscriber terminal 11 and central office 16 is two-way, that is, includes a downstream path from central office 16 to subscriber terminal 11, and an upstream path from subscriber terminal 11 to central office 16. Only the upstream path is described. It will be understood that a variety of techniques are suitable for use in the downstream path.

Figure 5:
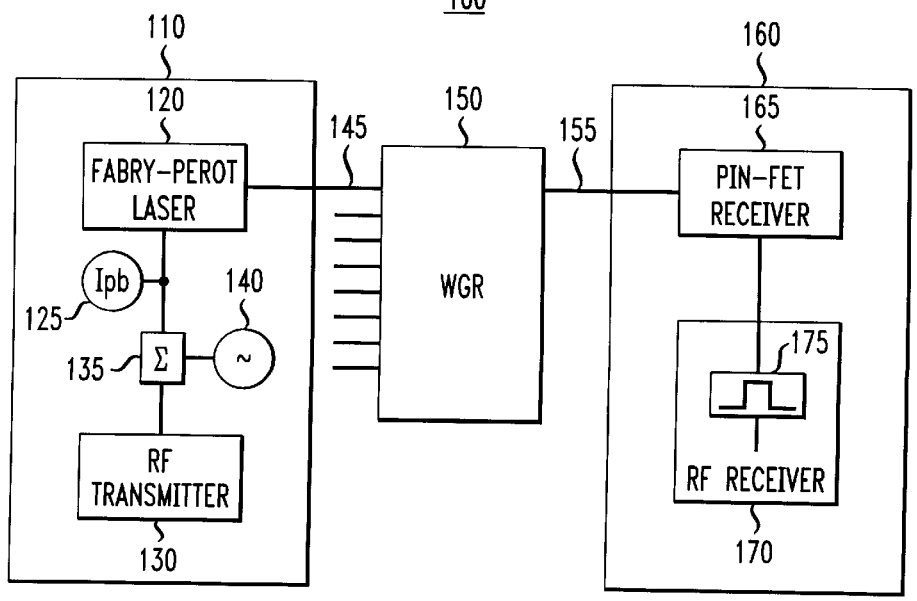
FIG. 5 is a block diagram of another embodiment of the present invention.

Referring now to FIG. 5, there is shown WDM PON 100, which differs from PON 10 mainly in that the laser at the subscriber terminal is a multimode laser, specifically, a Fabry-Perot laser, whereas the laser at the subscriber terminal in FIG. 3 is a multifrequency laser. Multimode lasers simultaneously emit light at multiple frequencies, where each frequency corresponds to a mode of the laser's resonating cavity.

WDM PON 100 comprises subscriber terminal 110 coupled by optical fiber 145 to remote node 150, which is, in turn, coupled by optical fiber 155 to central office 160. Subscriber terminal 110 includes laser 120, current source 125, radio frequency (RF) transmitter 130, combiner 135 and tone generator 140. Remote node 150 is shown as waveguide grating router (WGR) 150. Central office 160 includes optoelectronic receiver 165 and RF receiver 170 having bandpass filter 175.

The RF signal from RF transmitter 130 is added to a clipping tone, such as a tone having an optical modulation depth (OMD) of 100% at 2 GHZ, generated by tone generator 140. The clipping tone is used to make the power in the optical modes of laser 120 be more uniform across the modes. "Clipping" refers to driving the laser with a time varying current having excursions below the laser's threshold current, which affects the output optical power of laser 120. OMD is defined in Petermann, "Laser Diode Modulation and Noise", *Advances in Optoelectronics*, page 110, equation 4.57. OMD is a measure of the AC portion of a signal as compared to the DC portion of the signal.

In an experiment, transmission loss through WGR 150, without the clipping tone from tone generator 140, varied from 13 dB to 31 dB; while the transmission loss with the clipping tone present varied from 15 dB to 22 Db, thereby improving minimum power and dynamic range.

Laser 120 is a multi-mode uncooled (not temperature controlled) laser, such as a Fabry-Perot laser. As shown by the dotted curve in FIG. 6, a Fabry-Perot laser as conventionally operated generates multiple modes having substantially unequal power. The center wavelength of the laser depicted in FIG. 6 is at 1303 nm. For example, mode 205 is at −50 dB, mode 215 is at about −35 dB, mode 225 is at −20 dB and mode 235 is at about −42 dB. Assuming that a power of at least −40 dB is required for a usable mode, it will be seen that only a small number of modes clustered around the center wavelength are usable for a conventionally operated Fabry-Perot laser, making it unsuitable for use as a broadband source. In other words, many of the modes have too little power to be usable.

In accordance with the present invention, laser 120 is modulated with a current which drives it below its threshold current, thereby driving laser 120 into clipping and, importantly, making the power in more of the modes comparable and sufficiently high to be usable, allowing laser 120 to operate as a broadband multi-mode source. For example, as shown by the solid curve in FIG. 6, mode 210, which corresponds to a clipped version of mode 205, has a power of about −35 dB; mode 220, which corresponds to a clipped version of mode 215, has a power of about −30 dB; mode 230, which corresponds to a clipped version of mode 225, has a power of about −32 dB; and mode 240, which corresponds to a clipped version of mode 235, has a power of about −40 dB. For the Fabry-Perot laser of FIG. 6, clipping has increased the number of usable (sufficiently powerful) modes from about 10 modes to over 20 modes.

The output of WGR 150 is supplied, via optical fiber 155, to central office 160, specifically, to optoelectronic receiver 165, which may be a PIN photodiode, a p-n junction with an intermediate lightly doped "intrinsic" region, coupled to a field effect transistor (PIN-FET). Receiver 165 functions to convert the optical signal from WGR 150 into an electronic signal, and to supply the electronic signal to RF receiver 170, which functions to separate the signals from the subscribers. RF receiver 170 includes a plurality of bandpass filters 175, each corresponding to the radio frequencies used by the subscribers. The separated signals are processed appropriately by devices (not shown).

As described above, in this embodiment, the spectrum of a Fabry-Perot laser is broadened by driving the laser into clipping. Light is guaranteed to be transmitted through each port of the WGR by compatible mode spacing in which the mode spacing of the laser is selected to be less than the channel spacing of the WGR.

Thus, a Fabry-Perot laser can be used as a broadband multi-mode light source. Alignment of the laser modes and WGR channel passbands is not required. As compared to LEDs, Fabry-Perot lasers are faster and have approximately ten times as much signal output power, allowing for more bandwidth and distance between each subscriber terminal and the WGR. Additionally, uncooled, unisolated Fabry-Perot lasers are cheaper than LEDs.

Transmitting light through a narrow optical bandpass filter, such as WGR 150, converts mode fluctuations into relative intensity noise (RIN). In an experiment, light from laser 120 had RIN of −135 dB/Hz, but after passing through WGR 150, the light's RIN increased by 40 dB to approximately −95 dB/Hz. The RIN caused by mode fluctuations is a significant source of noise.

RF transmitter 130 produces an RF signal. If a baseband signal is used in place of an RF signal, then the RIN within the signal band increases. Use of an RF subcarrier accommodates multiple users, either by assigning each user a different subcarrier in a subcarrier multiplexing (SCM) scheme or by sharing a single RF channel using a time division multiple access (TDMA) scheme.

When light from multiple simultaneously transmitting lasers is combined at WGR 150, RIN from the optical source of a channel using one WGR input port can cause errors in another channel. To minimize such errors, it is desirable to equalize the power in the channels output from WGR 150. Such power equalization is achieved by adjusting the pre-bias current 125 so that the QPSK signal power received at central office 160 is a constant value, for each input to WGR 150. Adjusting the pre-bias current is preferred over adjusting the RF drive level to the laser, because reducing the output power of laser 120 reduces both the signal level and noise, but reducing the RF drive of laser 120 does not significantly reduce noise.

Figure 7A:
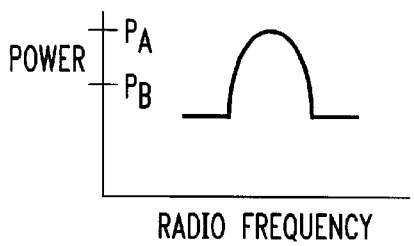
FIGS. 7A–7D are charts illustrating an RF spectrum without equalization.
Figure 7B:
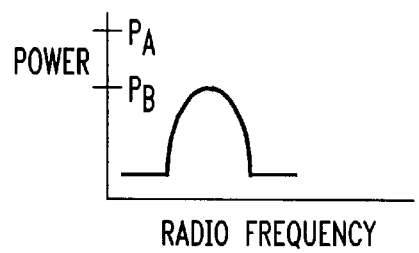
Figure 7C:
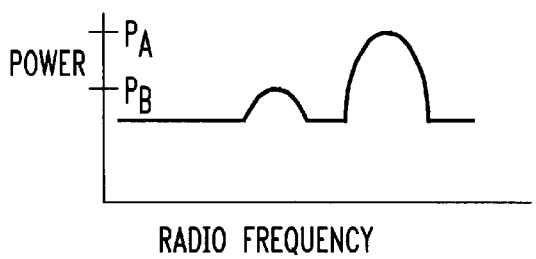
Figure 7D:
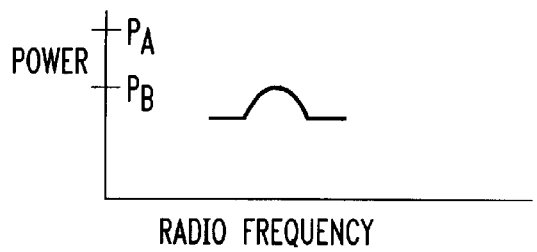

An example of the RF spectrum received at the central office without equalization is illustrated in FIGS. 7A–7D. FIG. 7A shows the spectrum of a first signal A, at a first maximum signal strength $P_A$, while FIG. 7B shows the spectrum of a second signal B having a lower center frequency, at a second maximum signal strength $P_B$, $P_B < P_A$. FIG. 7C shows the relevant portion of the spectrum received at receiver 165, wherein the differing signal strengths are apparent. FIG. 7D shows the output of bandpass filter 175 for signal B. The higher initial strength of signal A causes the signal to noise ratio (SNR) of signal B to be degraded, because strong noise from signal A will pass through filter 175.

Figure 8A:
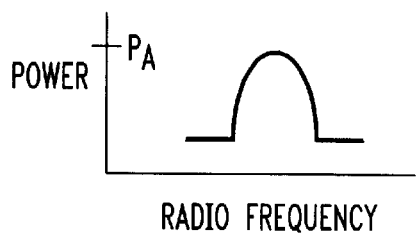
FIGS. 8A–8D are charts illustrating an RF spectrum with equalization.
Figure 8B:
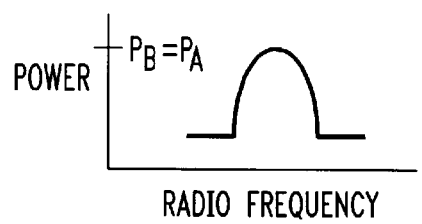
Figure 8C:
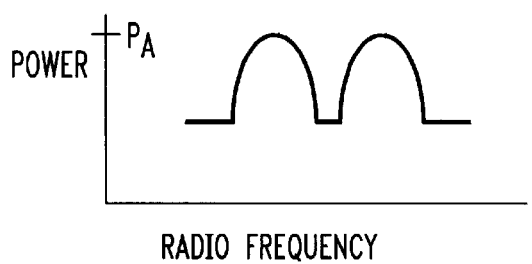
Figure 8D:
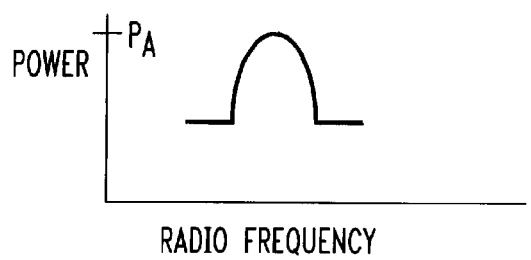

Correction of the error by power equalization is illustrated in FIGS. 8A–8D. FIG. 8A corresponds to FIG. 7A, and illustrates a first input signal. FIG. 8B illustrates a second input signal having a power level equalized with that of the first input signal. FIG. 8C shows that the power levels received at receiver 165 are equal. FIG. 8D depicts how the SNR of the bandpass filtered second signal is higher relative to the corresponding SNR in FIG. 7D, reducing the problem of signal degradation due to noise from another stronger channel.

Figure 9:
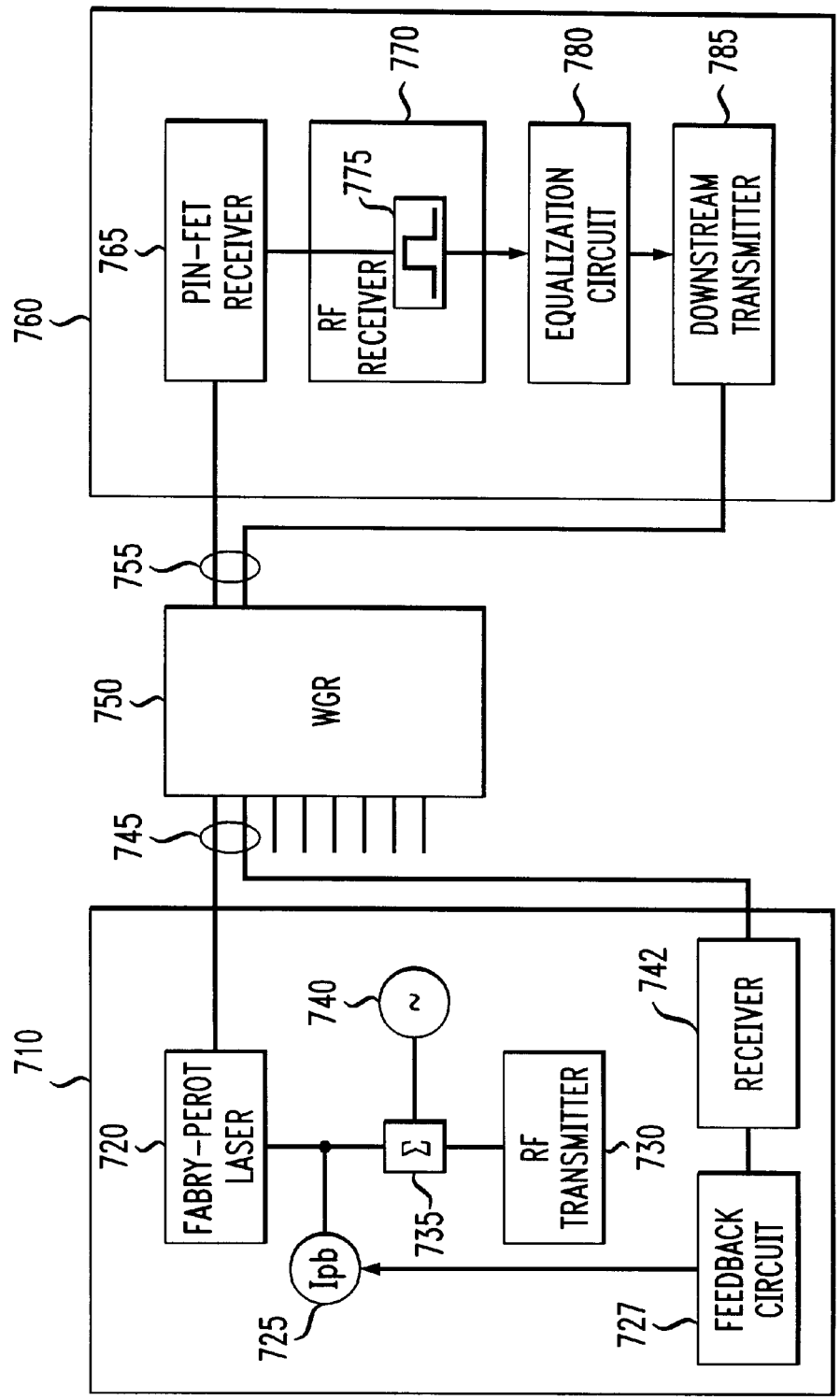
FIG. 9 is a block diagram of another embodiment of the present invention.

FIG. 9 shows another embodiment of the present invention. WDM PON 700 is similar to WDM PON 100. For brevity, a description of corresponding elements of WDM PONs 100 and 700 is omitted. WDM PON 700 additionally includes feedback circuit 727, receiver 742, equalization circuit 780 and downstream transmitter 785.

RF receiver 770 monitors the signal strength and sends a value representing the signal strength to equalization circuit 780, which is adapted to calculate whether the power of the signal emitted by laser 720 should be modified, that is, increased or decreased, in accordance with well-known techniques. Equalization circuit 780 also functions to send a signal downstream to receiver 742 via transmitter 785, via the channel to terminal 710 or via a separate control channel, indicating the desired modification.

Receiver 742 serves to receive the modification signal from transmitter 785 and to supply the modification signal to feedback circuit 727 which uses the modification signal to produce a correction signal in accordance with well-known techniques and supplies the correction signal to prebias current generator 725. In response to the correction signal, prebias current generator 725 corrects the level of the prebias current supplied to laser 720.

Referring now to FIG. 10, there is shown another embodiment of the present invention. WDM PON 300 comprises subscriber terminal 310 coupled by optical fiber 345 to remote node 350, which is, in turn, coupled by optical fiber 355 to central office 360. Subscriber terminal 310 includes laser 320, current source 325, data source 330, combiner 335, mixer 337 and tone generator 340. Remote node 350 is shown as WGR 350. Central office 360 includes optical receiver 365, filter 370, decision element 375 and data processor 380.

The major difference between WDM PON 100 of FIG. 5 and WDM PON 300 of FIG. 10 is that, in WDM PON 300, baseband transmission is used instead of subcarrier multiplexing. Additionally, the signals from different subscribers are time division multiplexed so that signals from different subscribers arrive at central office 360 at different times. For brevity, elements of FIG. 10 corresponding to those of FIG. 5 will not be described.

Data source 330 produces a data signal in a baseband format and supplies the data signal to combiner 335 and mixer 337. Mixer 337 is adapted to mix the clipping signal with the data, thereby modulating the clipping signal with the data. Combiner 335 adds the data to the modulated clipping signal so that the laser's bias current is above the laser threshold current when data is being transmitted, but below the threshold current when data is not being transmitted. TDMA is controlled by communication between the central office and the terminal in a conventional manner.

Current source 325 is set so that no light is transmitted when the data consists of zeros. This reduces the noise at the receiver caused by mode fluctuations.

Optical receiver 365 serves to receive the light output from WGR 150 and to convert it to an electronic signal, and to supply the electronic signal to filter 370 which reduces the noise at the decision circuit. The filtered signal is applied to decision element 375, which is adapted to decide whether the signal represents a "0" or "1" data element, and to supply the obtained data element to data processor 380 for appropriate processing.

Figure 11A:
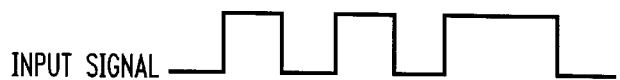
FIGS. 11A–11E show signal formats at various points in the embodiment of FIG. 10.
Figure 11B:
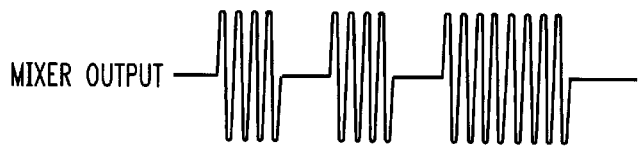
Figure 11C:
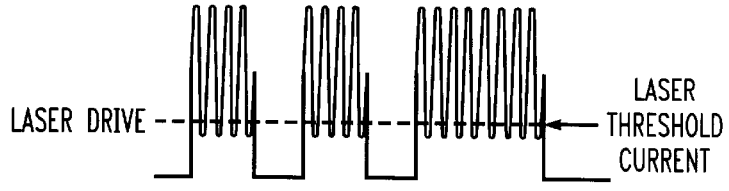
Figure 11D:
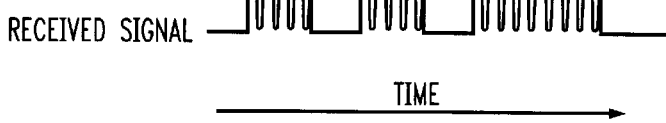
Figure 11E:
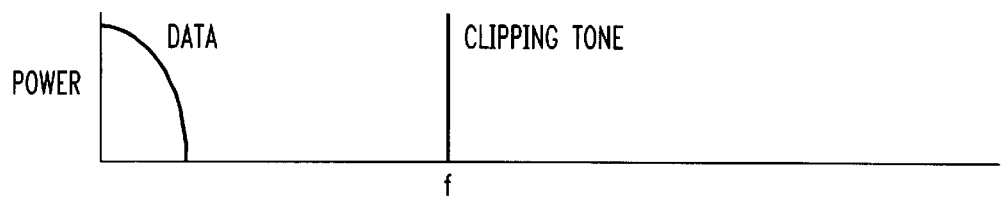

FIGS. 11A–11E show the signal formats at various points in WDM PON 300. As shown in FIG. 11A, data is supplied to data source 330. FIG. 11B illustrates the signal supplied from data source 330 to combiner 335 and mixer 337. FIG. 11C shows the output of mixer 337. FIG. 11D shows the input to laser 320. As can be seen, the RF component of the signal variation falls below the threshold current level of laser 320, thereby broadening the optical spectrum of the light output from laser 320. FIG. 11E shows the output of WGR 350, as received by receiver 365. The charts in FIGS. 11A–11E illustrate data consisting of "0" and "1" values, but multilevel signals could be used in other embodiments.

Figures 12A, 12B:
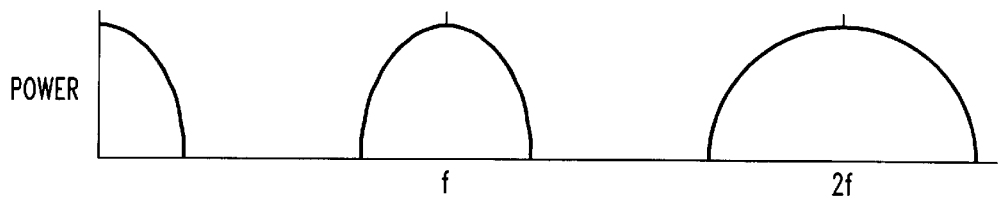
FIGS. 12A–12B show power spectra at various points in the embodiment of FIG. 10.

FIG. 12A shows the power spectrum of the data signal produced by data source 330, and also the power spectrum of the clipping tone produced by tone generator 340. FIG. 12B shows the power spectrum of the signal received by optical receiver 365. It will be understood that FIG. 12B shows only a portion of the received power spectrum corresponding to the signal in FIG. 12A, that is, signals from other subscriber terminals are not shown. The relative strength of the signals shown in FIG. 12B depends on distortion, for example, at twice the clipping tone frequency, the spectrum appears swollen. Filter 370 can be a low pass filter or a bandpass filter centered at f or 2f, as the data can be recovered from the signal component at DC, the signal component centered at f or the signal component centered at 2f, as shown in FIG. 12B.

Figure 13:
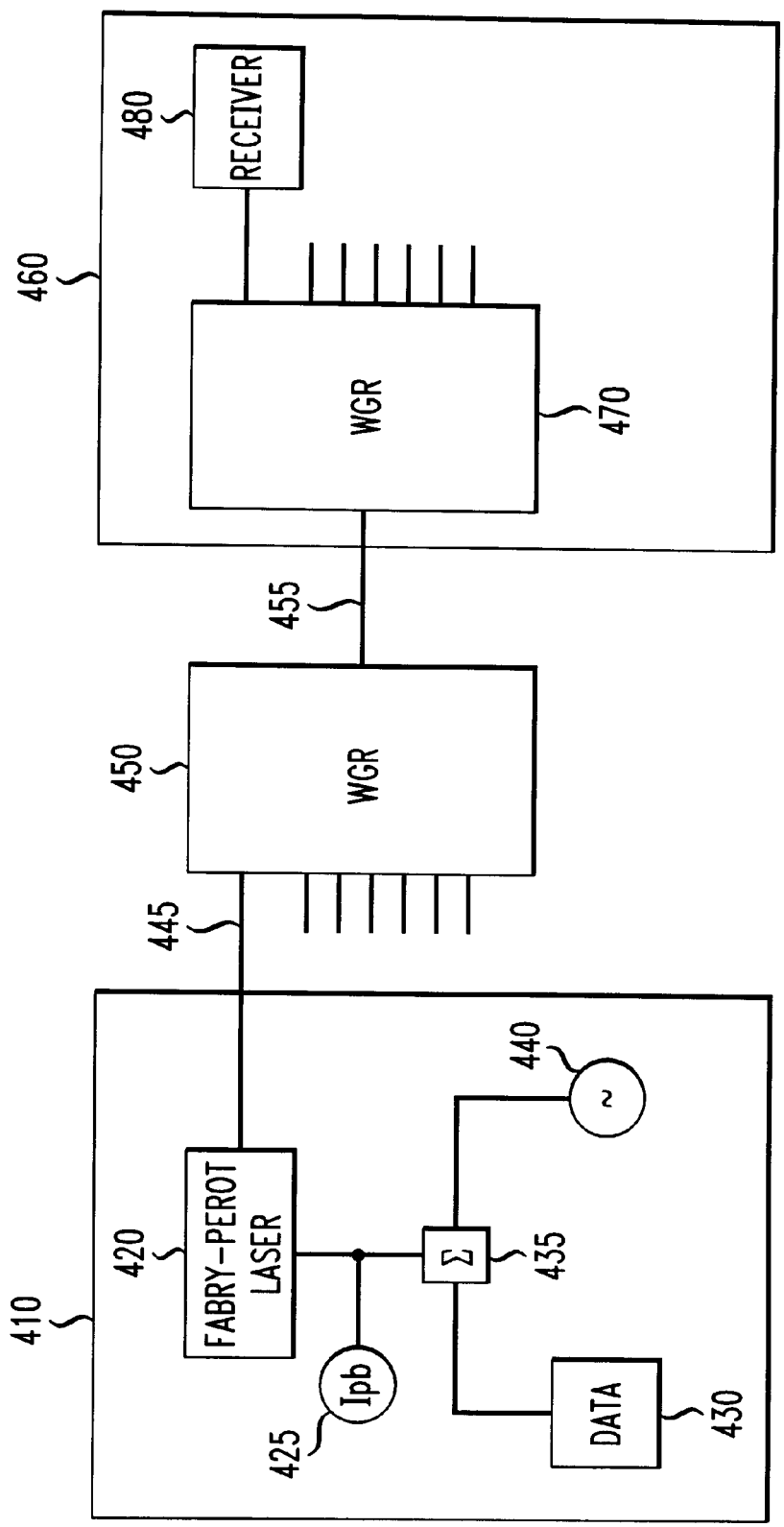
FIGS. 13–15 are block diagrams of respective other embodiments of the present invention.

Referring now to FIG. 13, there is shown another embodiment of the present invention. WDM PON 400 comprises subscriber terminal 410 coupled by optical fiber 445 to remote node 450, which is, in turn, coupled by optical fiber 455 to central office 460. Subscriber terminal 410 includes laser 420, current source 425, data source 430, combiner 435 and tone generator 440. Remote node 450 is shown as WGR 450. Central office 460 includes WGR 470 and receivers 480.

The major difference between WDM PON 100 of FIG. 5 and WDM PON 400 of FIG. 13 is that wavelength division multiplexing (WDM) is used instead of subcarrier multiplexing (SCM). See Frigo pages 488–496 for a description of WDM. Importantly, WDM requires the presence of a second WGR, shown as WGR 470, and separate receivers 480 for each channel, which substantially increases the cost of WDM PON 400 relative to WDM PON 100.

Figure 14:
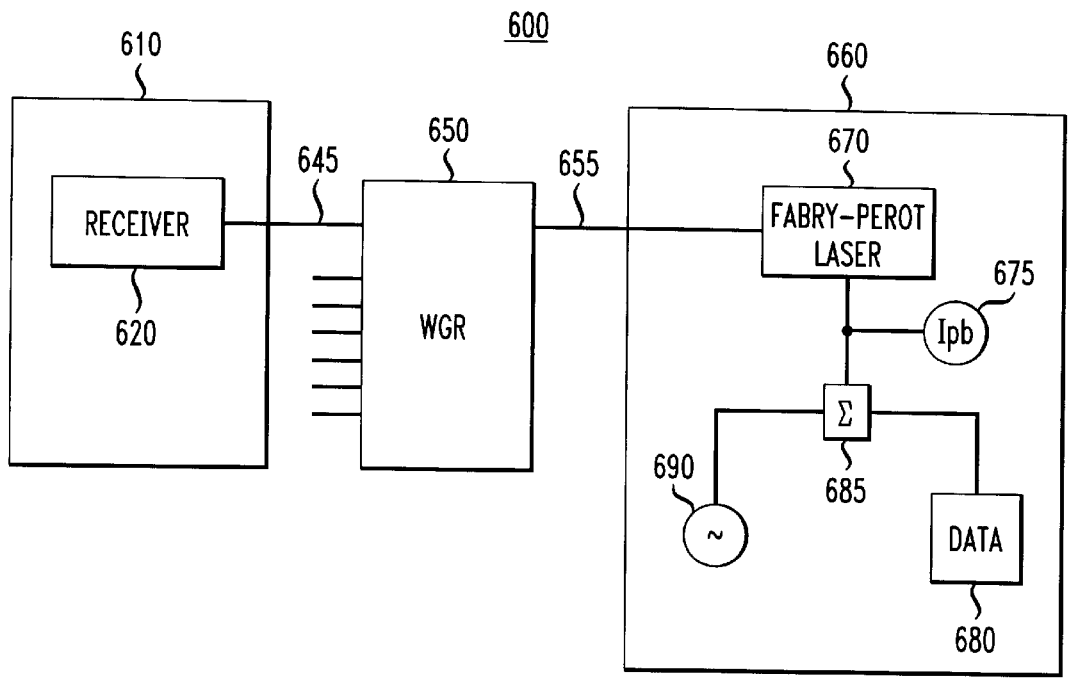

Referring now to FIG. 14, there is shown another embodiment of the present invention. WDM PON 600 comprises subscriber terminal 610 coupled by optical fiber 645 to remote node 650, which is, in turn, coupled by optical fiber 655 to central office 660. Subscriber terminal 610 includes receiver 420. Remote node 650 is shown as WGR 650. Central office 660 includes laser 670, current source 675, data source 680, combiner 685 and tone generator 690.

The major difference between WDM PON 100 of FIG. 5 and WDM PON 600 of FIG. 14 is that a Fabry-Perot laser is shown as being used for downstream transmission, rather than upstream transmission. Elements of FIG. 14 corresponding to those in FIG. 5 operate in a generally similar manner, and will not be described, for brevity.

In the downstream direction, a single frequency laser, such as a distributed feedback laser, cannot be used to broadcast through a router as its light will go to one user, or, if the router has virtually no guard band between output ports, at most two users.

Data source 680 produces a QPSK signal transmitted in SCM format, but could instead be a baseband signal or a QPSK signal transmitted in WDM or time division multiplexed (TDM) format, with modifications to FIG. 12 as would be understood by one of ordinary skill from the foregoing discussion.

In some hybrid embodiments, selected subscriber terminals have an LED as the light source while other subscriber terminals use a laser as their light source. As an example, subscriber terminals close to the central office may be equipped with an LED, while subscriber terminals further from the central office, possibly beyond the usable distance of an LED, may be equipped with a laser.

Figure 15:
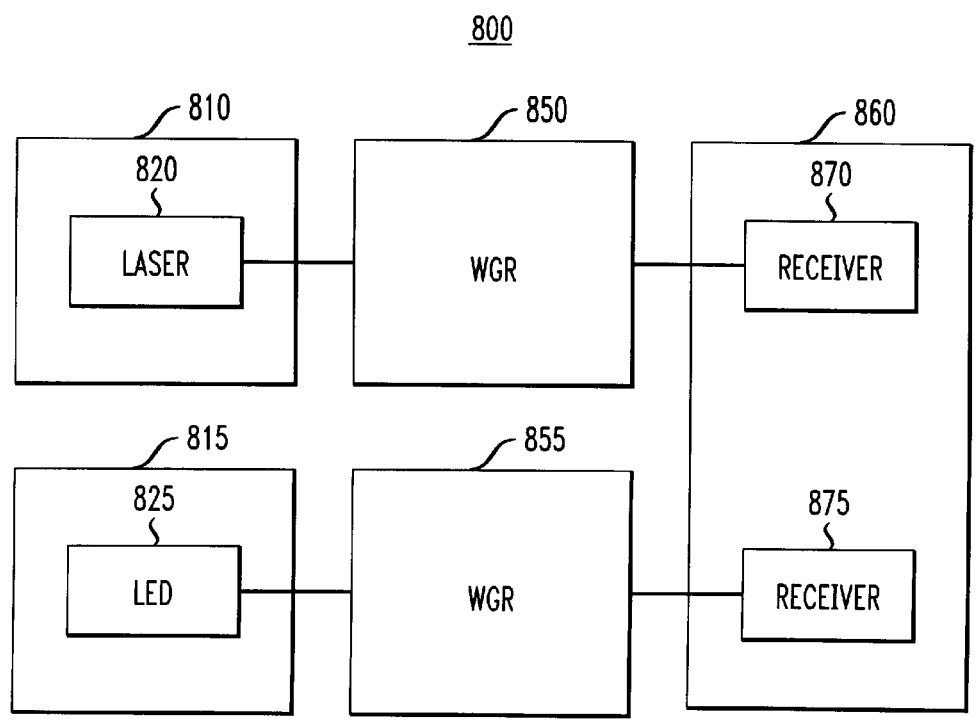

FIG. 15 shows hybrid WDM PON 800 having subscriber terminals 810, 815, coupled by optical fibers to remote nodes 850, 855, respectively, which are, in turn, coupled by respective optical fibers to central office 860. Subscriber terminal 810 includes laser 820 as a light source. Subscriber terminal 815 includes LED 825 as a light source. Remote nodes 850, 855 are each shown as a WGR. Central office 860 includes receivers 870, 875 for receiving the light from subscriber terminals 810, 815, respectively. It will be appreciated that these subscriber terminals are representative, and that WDM PON 800 actually has a plurality of subscriber terminals, some having a laser as a light source, others having an LED as a light source.

Selection of an LED or laser at each subscriber terminal may be based on considerations such as cost, environment concerns, reliability, installed base, signal power and other appropriate factors. Letting $P^0_{FP}$ represent the power of the signal emitted by laser 820 and $P^1_{FP}$ represent the power of the signal received by receiver 870, then $$P^1_{FP} = P^0_{FP} - X - Y - Z - 10 \log_{10} N$$

where
- X is the worst case rolloff of the WGR port compared to the central port. The term monitors the fact that on the ports at the edges, there may be a lower transmission efficiency.
- Y is the maximum multi-mode mismatch. This quantity will be a function of the mode spacing and the overall location of the laser modes when respect to the WGR passbands.
- Z is the laser rolloff itself: the laser modes will not be uniform in power, and thus may have a situation in which lower power modes are the only ones that pass through the WGR transmission band. The last term is the overall splitting ratio, and is understood to accommodate excess loss as well.

Similarly, letting $P^0_{LED}$ represent the power of the signal emitted by LED 825 and $P^1_{LED}$ represent the power of the signal received by receiver 875, then $$P^1_{LED} = P^0_{LED} - X' - Y' - 10 \log_{10} N$$

- X' is X as above
- Y' is the effect of non-ideal passband: the Gaussian shape transmits less light than an ideal rectangular filter. In practice, this is approximately 2 dB.
- Z' is the spectral location of the source and any band filter that may be used. In the case that there is a full band of LED light used to illuminate the WGR, this term is zero, but if a restricted wavelength band is used, it may take a select portion of the spectrum, but this portion may be in a spectral location that has a weaker power spectral density.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A passive optical network (PON) comprising:
   an optical source for producing light at a plurality of optical frequencies,
   an optical receiver for receiving light produced by the optical source,
   a wavelength division multiplexer for transmitting the light produced by the optical source to the optical receiver, the wavelength division multiplexer having passbands centered at respective center frequencies, each of the center frequencies being different than the optical frequencies.

2. The PON of claim 1, wherein the temperature of the optical source is uncontrolled.

3. The PON of claim 1, wherein the optical source is a multifrequency laser.

4. The PON of claim 1, wherein the optical source is a multimode laser.

5. The PON of claim 4, wherein the multimode laser is driven into clipping to increase the number of usable modes.

6. The PON of claim 4, wherein the multimode laser is a Fabry-Perot laser.

7. The PON of claim 1, wherein the optical source is an array of lasers.

8. The PON of claim 1, wherein the wavelength division multiplexer transmits light produced by the optical device in each of its passbands.

9. The PON of claim 1, wherein the wavelength division multiplexer is a waveguide grating router.

10. The PON of claim 1, wherein the spacing between the optical frequencies is less than the spacing between the center frequencies.

11. The PON of claim 10, wherein the spacing between the optical frequencies is less than the width of the passbands.

12. The PON of claim 10, wherein the wavelength division multiplexer is a waveguide grating router having a free spectral range, and the optical frequencies have a frequency range which is more than the free spectral range.

13. The PON of claim 1, wherein the spacing between the optical frequencies is greater than the spacing between the center frequencies.

14. The PON of claim 1, wherein the optical source is associated with a first subscriber, and further comprising at least one additional optical source associated with at least one additional subscriber, and means for equalizing the light from different optical sources.

15. The PON of claim 14, wherein the means for equalizing is a prebias current supplied to one of the optical sources.

16. A passive optical network (PON) comprising:
   a plurality of optical sources, each for producing light at a plurality of optical frequencies, a plurality of optical receivers for respectively receiving light produced by the optical sources, a plurality of wavelength division multiplexers, each for transmitting the light produced by a respective associated one of the optical sources to a respective one of the optical receivers, each of the wavelength division multiplexers having passbands centered at respective center frequencies, each of the center frequencies of at least one wavelength division multiplexer being different than the optical frequencies of its associated optical source.

17. The PON of claim 16, wherein at least one of the optical sources is a laser and at least one of the optical sources is a light emitting diode.

* * * * *